United States Patent [19]

Damon et al.

[11] Patent Number: 4,892,178

[45] Date of Patent: Jan. 9, 1990

[54] VISCOUS DAMPER MODULE FOR TORSIONAL VIBRATION DAMPING MECHANISM

[75] Inventors: Gerald D. Damon, Farmington; Robert S. Mueller, Birmingham, both of Mich.

[73] Assignee: Eaton Corporation, Cleveland, Ohio

[*] Notice: The Portion of the term of this patent subsequent to Oct. 17, 2006, has been disclaimed.

[21] Appl. No.: 87,586

[22] Filed: Aug. 20, 1987

[51] Int. Cl.⁴ .................. F16D 3/66; F16D 47/06
[52] U.S. Cl. .................. 192/106.2; 192/58 B; 192/106.1; 464/24; 464/68
[58] Field of Search .......... 192/106.2, 58 B, 106.1; 464/24, 68

[56] References Cited

U.S. PATENT DOCUMENTS

| | | | |
|---|---|---|---|
| 4,138,003 | 2/1979 | Malloy | 192/106.1 X |
| 4,212,380 | 7/1980 | Billet | 192/106.2 |
| 4,351,167 | 9/1982 | Hanke et al. | 192/106.2 X |
| 4,440,283 | 4/1984 | Nioloux | 192/106.2 |
| 4,557,357 | 12/1985 | Tinholt | 192/3.21 |
| 4,576,259 | 3/1986 | Bopp | 192/3.21 |
| 4,601,676 | 7/1976 | Tojima | 464/24 |
| 4,700,821 | 10/1987 | Maucher et al. | 192/106.2 |
| 4,782,932 | 11/1988 | Janson | 192/70.17 |
| 4,782,936 | 11/1988 | Bopp | 192/106.2 |

FOREIGN PATENT DOCUMENTS 0223442 5/1987 European Pat. Off. ......... 192/106.1

*Primary Examiner*—Rodney H. Bonck
*Attorney, Agent, or Firm*—P. S. Rulon

[57] ABSTRACT

A torsional vibration damping mechanism (30) is disclosed in a clutch plate assembly (24) for a vehicle driveline. Mechanism (30) includes a set (36) of relative high rate helical compression springs 62, 64 for transmitting torque and alternating torsionals when a transmission input shaft (22) is connected to a load, a set (38) of relatively low rate helical compression springs (66) connected in series with spring set (36) and for attenuating torsionals when the shaft (22) is not connected to a load, and a viscous damper module (48) disposed in parallel with both spring sets (36, 38) and operative to dampen recoil of both spring sets. The viscous damper module is readily fitted to known clutch plate assemblies in lieu of mechanical friction dampers previously employed to dampen recoil of the helical compression springs in such assemblies.

15 Claims, 3 Drawing Sheets

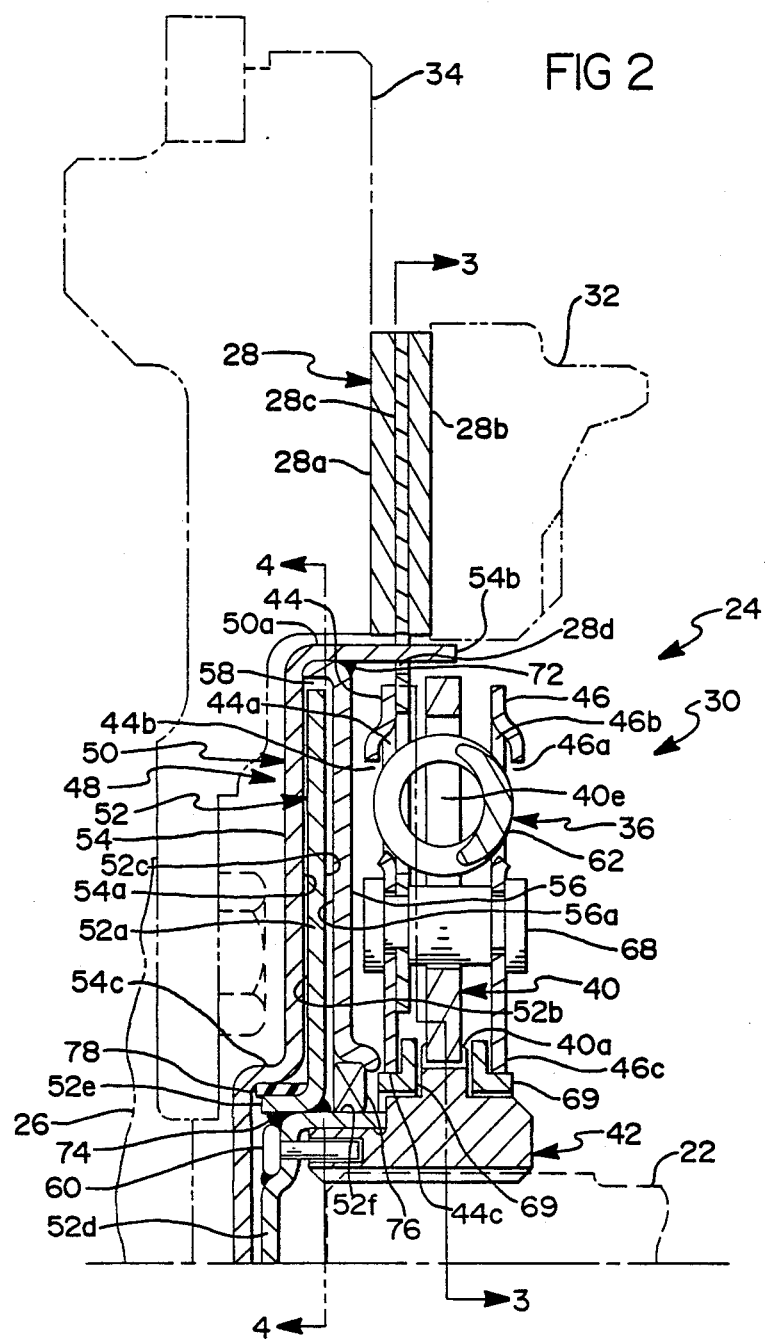

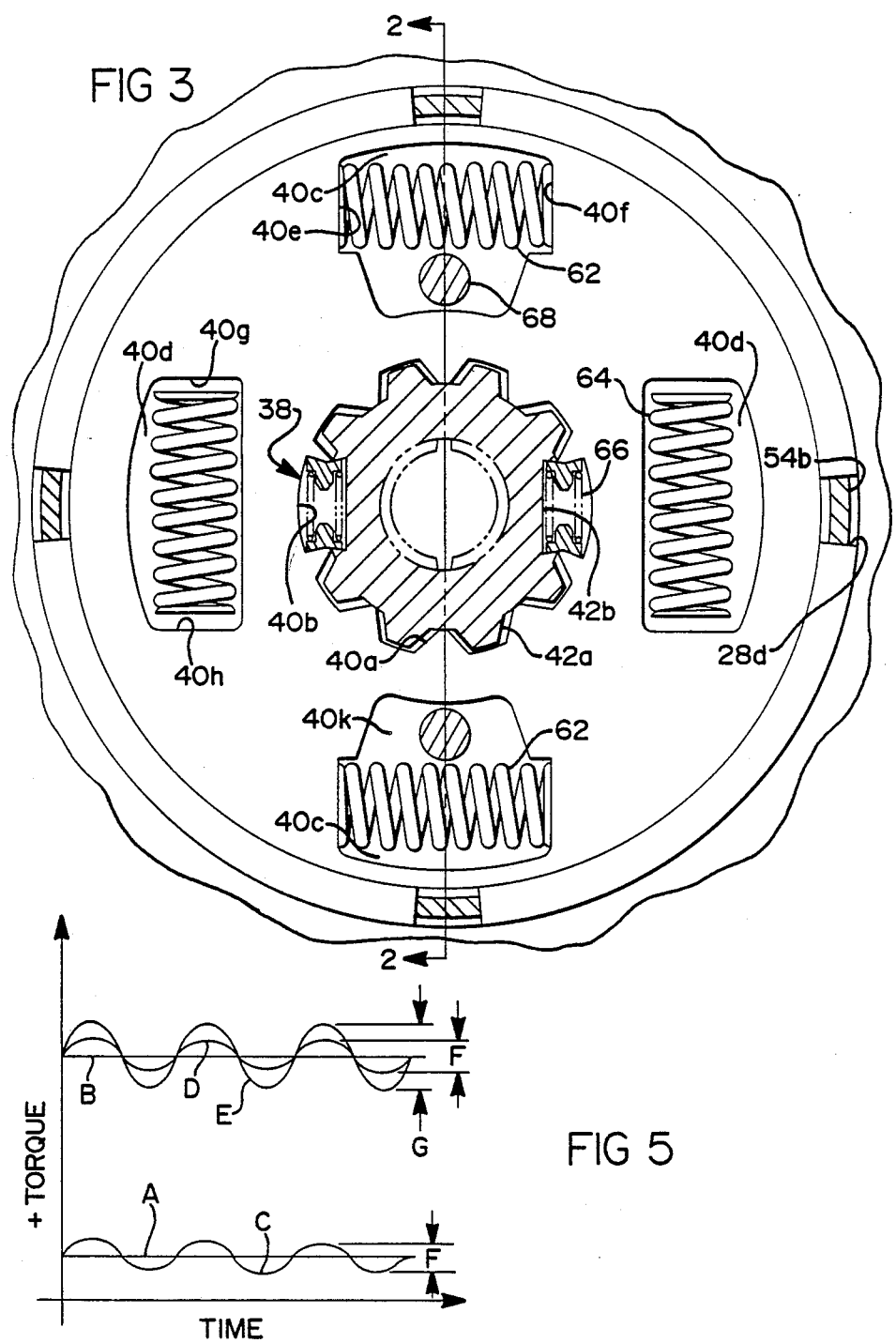

VISCOUS DAMPER MODULE FOR TORSIONAL VIBRATION DAMPING MECHANISM

CROSS-REFERENCE TO RELATED APPLICATIONS

The invention of this application relates to U.S. application Ser. No. 793,802, filed Nov. 1, 1985, now U.S. Pat. No. 4,782,732, and to U.S. application Ser. No. 087,587, filed 08-20-87. Both of these applications are assigned to the assignee of this application.

FIELD OF THE INVENTION

This invention relates to torsional vibration damping mechanisms. More specifically, this invention relates to viscous damper module for damping the rate of spring recoil in a torsional vibration damping mechanism.

BACKGROUND OF THE INVENTION

Torsional vibration damping mechanisms have long been used to reduce the adverse effects of torsional vibrations or fluctuating torques in vehicle drivelines. Such torsional vibrations or fluctuating torques, herein after referred to as torsionals, emanate primarily from engine power pulses and torque spikes, and from abrupt changes in driveline torque due primarily to rapid engine acceleration/deceleration and transmission ratio changes.

Most known, prior art torsional vibration damping mechanisms have employed springs disposed in parallel with a mechanical friction device. A well known and basic type of such mechanism has comprised plate like members mounted for limited relative rotation, a set of helical compression springs interconnecting the members and a mechanical friction device response to relative rotation of the members. Driveline torque is normally transmitted by the helical springs and flexing of the springs attenuates or reduces the potential amplitude of the driveline torsionals. The mechanical friction device dampens or reduces the rate of spring recoil. When the amplitude of the torsionals is less than the breakaway torque of the friction device, spring flexing does not occur and the torsionals are transmitted without benefit of attenuation.

Effective damping of torsionals by known torsional vibration damping mechanisms has become increasingly more difficult due to current development trends necessitated by a need to improve vehicle efficiency. The need to improve vehicle efficiency has resulted in reductions in vehicle size and weight, reductions in inertia of driveline components such as flywheel masses, reductions in the number of engine cylinders or chambers, reductions in engine speed, increases in the number of transmission gear ratios, reductions in transmission oil viscosity, and increased use of torque converter bypass clutches. Further, there has been an increased use of transmissions having constant mesh gears.

These developments have dramatically increased long existing problems with transmission gear rattle noise, vehicle body noise, and vehicle jerk. Gear rattle is often divided into two classes, i.e., idle rattle and in-gear rattle. In-gear rattle is sometimes referred to as driving mode gear rattle. Driveline torsionals provide the excitation for both types of rattle and the rattle or noise occurs when meshed gear teeth of unloaded gears bounce against each other. Body noise or body boom, as it is sometimes referred to, often occurs when an engine is lugged; under such a condition, driveline torsionals cause body components, such as sheet metal panels, to resonate. Vehicle jerk, also known as tip-in/tip-out, occurs in response to abrupt engine acceleration/deceleration and ratio changes.

The above problems often have conflicting solutions. For example, idle rattle occurs when a transmission is in neutral (i.e., not connected to a load) and the transmission input shaft is connected to an engine running at or near idle speed. Under such a condition driveline torque is relatively low, and the frequencies and amplitudes of the torsionals are also relatively low. Accordingly, the torsional vibration damping mechanism must have springs of relatively low spring rate and the damper must have a relatively low breakaway torque. In-gear rattle occurs when the transmission is driving a load. Under this condition driveline torque is relatively greater and the frequencies and amplitudes of the torsionals are also relatively greater. Accordingly, the torsional vibration damping mechanism, under this condition, must have springs of relatively higher spring rate and the damper must have a relatively higher breakaway torque.

U.S. Pat. No. 4,212,380 to Billet discloses the basic type of driveline torsional vibration damping mechanism with separate stages or assemblies for idle and in-gear conditions. Each stage or assembly provides attenuation and damping. The assembly for idle conditions includes a set of relatively low rate springs disposed in parallel with a mechanical friction damper of relatively low breakaway torque or torque capacity. The assembly for in-gear conditions includes a set of relatively high rate springs disposed in parallel with a mechanical friction damper of relatively high breakaway torque or torque capacity. The assemblies are disposed in series and the low capacity or idle rattle assembly becomes inoperative when the transmission is driving a load.

U.S. Pat. No. 4,440,283 to Nioloux discloses a driveline torsional vibration mechanism similar to the mechanism of Billet but not having damping for the idle rattle assembly.

The Billet and Nioloux mechanisms, though improvements over prior single stage mechanisms, have added cost and complexity, and in many applications have not provided the necessary results.

SUMMARY OF THE INVENTION

An object of this invention is to provide a torsional vibration damping mechanism having plate like members interconnected wish helical compression springs which are damped by a viscous shear damper module.

According to a feature of this invention, a torsional vibration damping mechanism is adapted to be rotationally interposed in a driveline between an output drive of a prime mover and an input drive of a transmission. The mechanism comprises first and second assemblies disposed for relative rotation about a common axis, the first assembly including first and second radially extending, axially spaced apart wall members secured together and adapted to drivingly connect to the prime mover drive, the second assembly including annular hub means adapted for connection to the transmission input drive, and bearing means for journaling the wall members on the hub means; an intermediate means including a radially extending member disposed between the first and second wall members, the member of the intermediate means drivingly connected to and extending radially outward of the hub means; a spring set comprising a plurality of helical compression springs of relatively high spring rate circumferentially spaced apart and resiliently interconnecting the wall members with the intermediate means member, the springs being flexibly operative to attenuate torsionals when the driveline is connected to a load; the improvement comprising:

a viscous shear damper module disposed axially adjacent the first assembly, the damper module including annular housing and clutch assemblies mounted for relative rotation, the housing assembly being fixed for rotation with the first assembly and having first and second axially spaced apart sidewalls defining a chamber containing a viscous shear liquid with at least one of said sidewalls having an interior surface defining a first clutching surface, the clutch assembly being drivingly connected to one of the means and having a portion thereof disposed in the chamber, the portion defining a second clutching surface closely spaced from the first clutching surface and in viscous clutching coaction therewith via the viscous shear liquid.

BRIEF DESCRIPTION OF THE DRAWINGS

The torsional vibration damping mechanism of the present invention is shown in the accompanying drawings in which:

FIG. 2 is a detailed, sectional view of the upper half of the torsional vibration damping mechanism looking along line 2—2 of FIG. 3;

FIG. 3 is a sectional view of a portion of the mechanism looking along line 3—3 of FIG. 2.

FIG. 5 is a graph schematically illustrating a band of low amplitude torsionals which are damped less than higher amplitude torsionals.

DETAILED DESCRIPTION OF THE DRAWINGS

Figure 1:
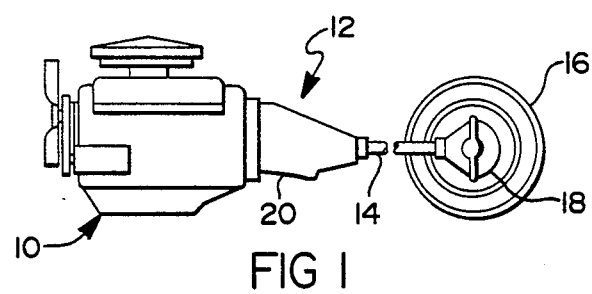
FIG. 1 is a schematic view of a motor vehicle driveline.

The motor vehicle driveline seen schematically in FIG. 1 includes a prime mover 10 and a transmission 12 having an output shaft 14 drivingly connected to a load such as a ground engaging wheel 16 via a differential gear assembly 18 for rear and/or front axles of a vehicle. Prime mover 10 is preferably of the internal, periodic combustion type but may be any type of power plant having torque characteristics that are improved by a torsional vibration damping mechanism. Transmission 12 includes a housing 20 containing a plurality of unshown, constant mesh ratio gears or ratio change mechanisms driven by a transmission input shaft on drive 22 partially shown in FIG. 2. Well-known ratio change devices or clutches within the transmission are employed to selectively (i.e., manually or automatically) put the transmission in a neutral position wherein the input shaft 22 is not connected to the load or in in-gear positions wherein the input shaft is connected to the load.

Looking now at FIGS. 2 and 3, therein is schematically illustrated in solid lines an annular clutch plate assembly 24 disposed for rotation about the axis of transmission input shaft 22. Shaft 22 may be journal supported at its left end by a partially shown output shaft or drive 26 of engine 10. Clutch plate assembly 24 includes an annular friction ring 28 in driving relation with shaft 22 via a torsional vibration damping mechanism 30 positioned radially between the friction ring and shaft 22. The friction ring includes oppositely facing friction surfaces 28a, 28b frictionally connectable to engine output shaft 26 in response to selective axial movement of a pressure plate 32 toward a flywheel 34 in well known manner.

The torsional vibration damping mechanism 30 includes first and second spring stages or spring sets 36, 38, and intermediate member 40, a hub 42, a support structure including annular plate like members 44, 46, and a viscous damper module 48. The damper module includes annular housing and clutch assemblies 50, 52. Support structure 44, 46 drivingly connects friction ring 28 in parallel with spring set 36 and a radially outer portion 50a of the housing assembly 50. Intermediate member 40 connects spring sets 36, 38 in series. Spring set 38 resiliently interconnects member 40 with hub 42. Hub 42 is slidably splined to shaft 22 in known manner. Annular housing assembly 50 includes axially spaced apart sidewalls 54, 56 defining a chamber 58 filled with a viscous liquid. Clutch assembly 52 is fixed for rotation with hub 42 via pins 60 and includes a radially extending portion 52a having oppositely facing surfaces 52b, 52c in close axially spaced relation with associated inner surfaces 54a, 56a of the sidewalls. The housing and clutch surfaces define clutch surfaces disposed for clutching coaction therebetween via the viscous shear liquid in response to relative rotation of the housing and clutch assemblies. Such relative rotation of course occurs in response to flexing of spring sets 36, 38. The viscous shear liquid is of high viscosity and is preferably a silicone oil; for example, dimethyl polysiloxane. The actual viscosity depends on driveline application, area and spacing of the housing and clutch surfaces, mean radius of the areas, etc.

As will be readily apparent hereinafter, spring set 36 has a relatively high spring rate and provides a main spring stage flexibly operative to transmit torque and attenuate torsionals between engine output shaft 26 and transmission input shaft 22 when shaft 22 is connected to a load; whereas, spring set 38 has a relatively low spring rate and provides an idle rattle spring stage flexibly operative to transmit torque and attenuate torsionals between the engine output shaft 26 and transmission input shaft 22 when shaft 22 is not connected to a load. Spring set 38 is saturated or nonflexibly operative when shaft 22 is connected to a load.

Damper module 48 is disposed in parallel with serially disposed spring sets 36, 38. Accordingly, viscous clutching coaction between the surfaces of the housing and clutch assemblies of the damper assembly is also disposed in parallel with the serially disposed spring sets and is therefore operative to dampen or reduce the rate of recoil of both spring sets. Hence, both spring sets are damped by a single damper.

Spring sets 36, 38, intermediate member 40, hub 42, support structure 44, 46, and viscous damper module 48 are now described in greater detail. Spring set 36 includes two pair of relatively high rate or stiff, helical compression springs 62, 64. Spring set 38 includes two relatively low rate or low stiffness, helical compression springs 66. The support structure 44, 46 includes the axially spaced apart, radially extending annular plates or walls 44, 46 rigidly secured together by two axially extending pins 68 which also secures a flange 28c of friction ring 28 to the support structure. The helically wound compression springs 62, 64 of spring set 36 are circumferentially spaced apart and disposed in axially aligned pairs of opening or windows 44a, 46a which each include circumferentially spaced apart ends or reaction surfaces 44b, 46b a butting relation with the associated spring. Inner peripheries 44c, 46c of walls 44, 46 are journaled on hub 42 by sleeve type bearings 69.

Intermediate member 40 is an annular radially extending member disposed between plates or walls 44, 46. Member 40, hub 42, and spring set 38 define an idle rattle assembly. The assembly includes internal spline teeth 40a, spring recesses 40b, external spline teeth 42a loosely received by teeth 40a, spring recesses 42b, the low rate helical compression springs 66, and spring end members 70. Member 40 also includes pairs of circumferentially spaced apart openings 40c, 40d each receiving one of the springs 62 or 64 and respectively having circumferentially spaced apart ends or reaction surfaces 40e, 40f and 40g, 40h disposed in abutting relation with the associated spring ends. A portion 40k of openings 40c extends radially inward to allow relative rotation between member 40 and the support structure (i.e., walls 44, 46).

In the disclosed embodiment, reaction surfaces 40g, 40h of openings 40d are circumferentially spaced from their associated spring ends so as to provide mechanism 30 with an apparent spring rate that increases after a predetermined amount of relative rotation between walls 44, 46 and member 40. The actual spring rate of the springs in each pair is preferably the same but may vary from pair-to-pair.

The damper assembly includes the annular housing and clutch assemblies 50, 52 which are formed by stamping and therefore are relatively inexpensive to manufacture since they require little or no machining. With respect to housing assembly 50, the radially extending chamber 58 defined by sidewalls 54, 56 is closed at its radially outer extent by an weld 72 which also secures the sidewalls together. The radially outer extent of the housing is secured to support structure 44, 46 by a plurality of axially extending tangs 54b received by opening 28d of friction ring flange 28c. Sidewall member 54 includes an annular dished central portion defining a cylindrical portion 54c.

Clutch assembly 52 includes a central cup-shaped member or portion 52d secured to hub 42 by the plurality of pins or fasteners 60, and the radially extending annular clutch or portion 52a includes an axially extending portion 52e secured to portion 52d by a weld 74. A sleeve bearing 78 disposed between cylindrical portions 52e and 54c journals housing wall 54 on clutch assembly 52 which is in-turn supported by hub 42. An outer cylindrical surface 54f of cup-shaped portion 52d provides a running surface for a dynamic seal 76 pressed at its outer periphery into a cylindrical opening defined by a radially inner extent of sidewall 56. As may be seen the central structure of housing and clutch assemblies is such that chamber 58 is sealed against leakage by one dynamic seal 76.

Figure 4:
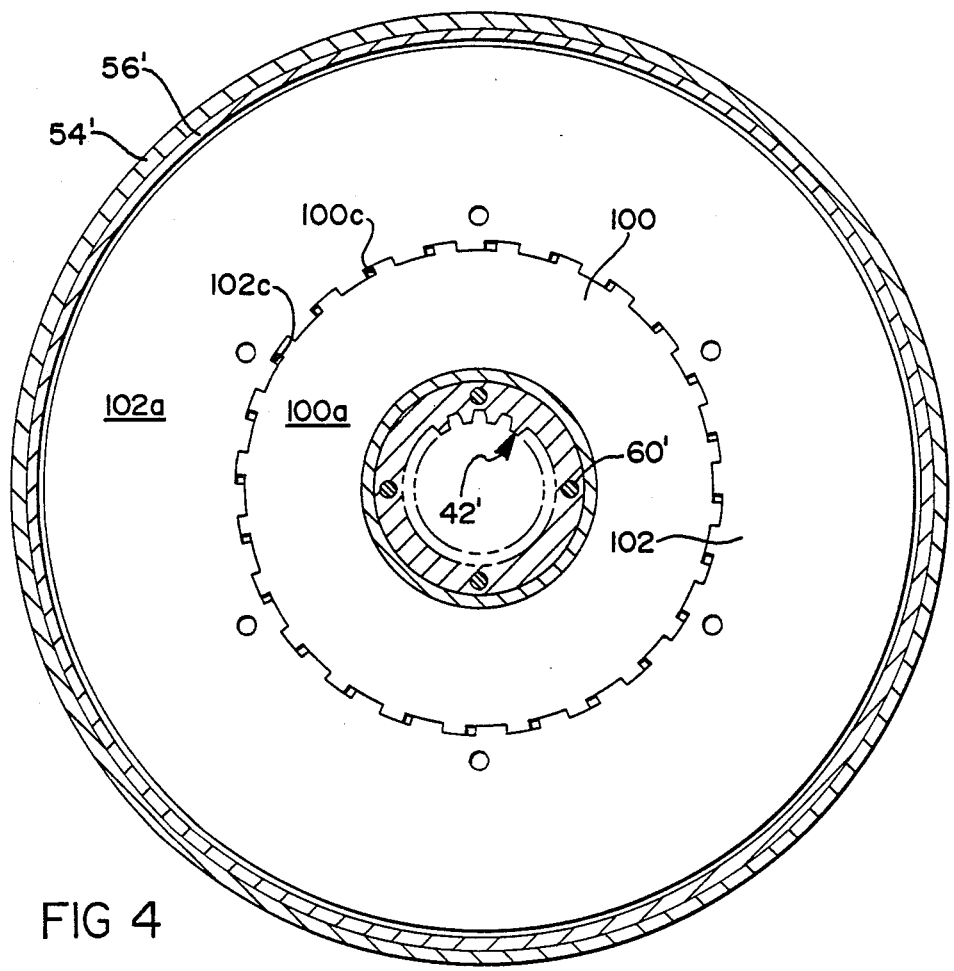
FIG. 4 is a detailed sectional view of a modified portion of the mechanism looking along line 4—4 of FIG. 2

Looking now at the modified embodiment of FIG. 4, therein elements identical to elements in FIGS. 2 and 3 will be given the same reference characters suffixed with a prime. The viscous shear damper module 48 differs from the damper module of FIGS. 2 and 3 only with respect to the radially extending, annular clutch portion 52a of clutch assembly 52. In FIG. 4 the radially extending, annular clutch portion includes radially inner and outer members 100, 102 each defining a portion of the second clutching means via oppositely facing surfaces 100a, 102a. The radially inner member has a radially inner portion as in FIGS. 2 and 3. The outer periphery of member 100 includes a plurality of external spline teeth 100c mating with a plurality of internal spine teeth 102c formed on the inner periphery of outer member 102. The radial flanks of teeth 100c, 102c are provided with a predetermined circumferential spacing or free play therebetween to form a lost motion means rendering viscous clutching coaction of the outer member inactive during flexing of the idle rattle spring 66 and during minor torsionals independent of the amount of torque being transmitted by the spring of the torsional vibration damping mechanism.

The graph of FIG. 5 schematically illustrates two driveline positive torque levels with s called steady-state torques being represented by straight curves A and B and having sinusoidal curves C and D, E respectively superimposed thereon to represent torsionals of different amplitude. Negative steady-state torques and torsionals may be represented in analogous manner. Curve A represents a driveline torque level during engine idle with clutch plate assembly 24 connected to engine 10 and transmission input shaft 22 disconnected from a load. Sinusoidal curve C represents relatively low amplitude torsionals having a peak-to-peak amplitude F and occurring during engine idle. During this idle mode of operation, torsionals having a peak-to-peak amplitude represented band F are attenuated by idle rattle springs 66 and damped only by viscous clutching coaction of inner clutch member 100 due to the lost motion means. Accordingly, the damping factor of viscous shear module 48 is relatively low during idle mode operation. Curve B represents a higher steady-state torque level when a load is being driven. At this higher torque level, idle rattle springs 66 are saturated or inactive. Sinusoidal curve D represents relatively low amplitude torsionals corresponding to the torsionals represented by curve C and also having a peak-to-peak amplitude represented by band F. The torsionals of curve D are attenuated by high rate springs 62, 64 and damped only be the viscous clutching coaction of inner clutching member 100 since the lost motion means between clutching members 100, 102 continues to be operative independent of the level of torque in the driveline. Higher amplitude torsionals, such as torsionals represented by curve E, have a greater peak-to-peak amplitude represented by band G. The torsionals of curve E are attenuated over their full bandwidth G by high rate springs 62, 64, and are damped first within band F only by viscous clutching coaction of inner clutching member 100 and beyond band F by viscous clutching coaction of both inner and outer clutching members 100, 102. Accordingly, viscous shear module 48 provides a relatively low damping factor for the portion of torsionals E within band F and a higher damping factor for the portion of their amplitude beyond band F.

Two detailed structural embodiments of the present invention have been disclosed herein for illustration purposes only. The viscous damper module is readily fitted to clutch plate assemblies of the type disclosed herein, thereby improving the torsional vibration damping characteristic of such assemblies without major redesign or tooling of these assemblies. The viscous damper module is velocity responsive and is therefore effective to dampen both high and low frequency torsionals whether employing a single piece clutching assembly as shown in FIGS. 2 and 3 or a two piece clutching assembly as shown in FIG. 4. Further, since the viscous damper module is velocity responsive, i.e., the modules damping factor increases with increasing relative velocity of its viscous clutch surface, it is also effective to dampen resonance mode torsionals without over damping lesser amplitude torsionals. The appended claims are intended to cover the inventive features of the disclosed embodiments and modifications of the inventive features believed to be within the spirit of the invention.

What is claimed is:

1. A torsional vibration damping mechanism in a free standing clutch plate assembly adapted to be rotationally interposed in a driveline between an output drive of a prime mover and an input drive of a transmission; the mechanism comprising:

first and second assemblies disposed for relative rotation about a common axis, the first assembly including first and second radially extending, axially spaced apart wall members secured together and adapted for driving connection to the prime mover drive, the second assembly including annular hub means adapted for connection to the transmission input drive, and bearing means for journaling a radially inner extent of at least one of the wall members on the hub means;

an intermediate means including a radially extending member disposed between the first and second wall members, the member of the intermediate means drivingly connected to and extending radially outward of the hub means;

a spring set disposed between radially inner and outer extends of the wall members, the spring set comprising a plurality of helical compression springs of relatively high spring rate circumferentially spaced apart and resiliently interconnecting the wall members with the intermediate means member, the springs being flexibly operative to attenuate torsionals when the driveline is connected to a load;

a friction assembly including first and second axially facing friction surfaces respectively defined on opposite sides of a radially extending flange, the friction surfaces disposed radially outward of the radially outer extent of the wall members, a radially inner portion of the flange fixed to the first assembly, and the friction surfaces adapted to be frictionally clamped between pressure plates of an engagement mechanism defining said input drive; the improvement comprising:

a viscous shear damper module disposed axially adjacent the first assembly, said damper module including annular housing and clutch assemblies mounted for relative rotation, the housing assembly having first and second axially spaced apart sidewalls defining a chamber containing a viscous shear liquid with at least one of said sidewalls having an interior surface defining a first clutching surface, said clutch assembly being drivingly connected to one of said means and having a radially extending portion thereof disposed in said chamber, said portion defining a second clutching surface closely spaced from said first clutching surface and in viscous clutching coaction therewith via said viscous shear liquid; and axially extending means fixing a radially outer portion of the annular housing assembly for rotation with the first assembly at positions radially outward of the spring set and radially inward of the axially facing friction surfaces.

2. The mechanism of claim 1, wherein the clutch assembly includes a radially inner portion fixed for rotation with the hub means.

3. The mechanism of claim 1, wherein the radially extending portion of the clutch assembly includes radially extending inner and outer members each defining a portion of the second clutching surface, the inner member having a radially inner portion fixed for rotation with the hub means, the radially outer member having a radially inner portion connected to a radially outer portion of the inner member by a lost motion means, whereby relative rotation between the first assembly and the hub means within the range of the lost motion means effects viscous damping by the second clutching surface of the inner member and relative rotation in excess to the range of the lost motion means effects viscous damping by the second clutching surface of the inner and outer members.

4. The mechanism of claim 3, wherein the intermediate means includes a plurality of internal spline teeth mating with a plurality of external spline teeth defined by the hub means, the internal and external teeth having a predetermined amount of circumferential free play therebetween; and wherein the mechanism further includes:

spring means of low spring rate relative to the spring rate of the helical compression springs, said spring means resiliently disposed between the intermediate and hub means for resiliently opposing the free play between the spline teeth, whereby flexing of said low rate spring means is damped by viscous clutching coaction of the second clutching surface of the inner member.

5. The mechanism of claim 1, wherein the sidewalls of the housing assembly are formed of sheet metal stampings.

6. The mechanism of claim 5, wherein the housing assembly is journaled on the hub means.

7. The mechanism of claim 1, wherein the axially extending means includes a plurality of tangs extending from the radially outer portion of the housing assembly and received in openings in the flange of the fraction assembly.

8. A torsional vibration damping mechanism in a free standing clutch plate assembly adapted to be rotationally interposed in a driveline between an output drive of a prime mover and an input drive of a transmission; the mechanism comprising:

first and second assemblies disposed for relative rotation about a common axis, the first assembly including first and second radially extending, axially spaced apart wall members secured together and adapted for driving connection to the prime mover drive, the second assembly including annular hub means adapted for connection to the transmission input drive, and bearing means for journaling a radially inner extent of at least one of the wall members on the hub means;

an intermediate means including a radially extending member disposed between the first and second wall members, the member of the intermediate means drivingly connected to and extending radially outward of the hub means;

a spring set disposed between radially inner and outer extents of the wall members, the spring set comprising a plurality of helical compression springs of relatively high spring rate circumferentially spaced apart and resiliently interconnecting the wall members with the intermediate means member, the springs being flexibly operative to attenuate torsionals when the driveline is connected to a load;

a friction assembly including first and second axially facing friction surfaces respectively defined on opposite sides of a radially extending flange, the friction surfaces disposed radially outward of the radially outer extent of the sidewall wall members, a radially inner portion of the flange fixed to the first assembly, and the friction surfaces adapted to be frictionally clamped between pressure plates of an engagement mechanism defining said input drive; the improvement comprising:

a viscous shear damper module disposed axially adjacent the first assembly, said damper module including annular housing and clutch assemblies mounted for relative rotation, the housing assembly having first and second axially spaced apart sidewalls defining a chamber containing a viscous shear liquid with at least one of said sidewalls having an interior surface defining a first clutching surface, said clutch assembly being drivingly connected to one of said means and having a radially extending portion thereof disposed in said chamber, said portion defining a second clutching surface closely spaced from said first clutching surface and in viscous clutching coaction therewith via said viscous shear liquid; and means for fixing the annular housing assembly for rotation with the first assembly at positions radially inward of the axially facing friction surfaces.

9. The mechanism of claim 8, wherein the clutch assembly includes a radially inner portion fixed for rotation with the hub means.

10. The mechanism of claim 8, wherein the radially extending portion of the clutch assembly includes radially extending inner and outer members each defining a portion of the second clutching surface, the inner member having a radially inner portion fixed for rotation with the hub means, the radially outer member having a radially inner portion connected to a radially outer portion of the inner member by a lost motion means, whereby relative rotation between the first assembly and the hub means within the range of the lost motion means effects viscous damping by the second clutching surface of the inner member and relative rotation in excess to the range of the lost motion means effects viscous damping by the second clutching surface of the inner and outer members.

11. The mechanism of claim 10, wherein the intermediate means includes a plurality of internal spline teeth mating with a plurality of external spline teeth defined by the hub means, the internal and external teeth having a predetermined amount of circumferential free play therebetween; and wherein the mechanism further includes:

spring means of low spring rate relative to the spring rate of the helical compression springs, said spring means resiliently disposed between the intermediate and hub means for resiliently opposing the free play between the spline teeth, whereby flexing of said low rate spring means is damped by viscous clutching coaction of the second clutching surface of the inner member.

12. The mechanism of claim 8, wherein the sidewalls of the housing assembly are formed of sheet metal stampings.

13. The mechanism of claim 12, wherein the housing assembly is journaled on the hub means.

14. The mechanism of claim 8, wherein the axially extending means including a plurality of tangs extending from the radially outer portion of the housing assembly and received in openings in the flange of the friction assembly.

15. The mechanism of claim 8, wherein the second sidewall of the damper module annular housing assembly and the second wall member of the first assembly are adjacent each other and disposed between the first sidewall of the damper module annular housing assembly and the first wall member of the first assembly, and said second sidewall and second members are separate members.

* * * * *